(12) United States Patent
Alcorn et al.

(10) Patent No.: US 6,909,432 B2
(45) Date of Patent: Jun. 21, 2005

(54) CENTRALIZED SCALABLE RESOURCE ARCHITECTURE AND SYSTEM

(75) Inventors: Byron A. Alcorn, Fort Collins, CO (US); Kevin T. Lefebvre, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 213 days.

(21) Appl. No.: 10/086,060

(22) Filed: Feb. 27, 2002

(65) Prior Publication Data

US 2003/0160795 A1 Aug. 28, 2003

(51) Int. Cl.[7] ............................................... G06T 1/20
(52) U.S. Cl. ...................................... 345/506; 345/1.1
(58) Field of Search ................................ 345/505, 506, 345/502, 501, 503, 1.1, 1.3; 709/223, 226, 217, 218; 710/305, 316, 317; 718/100, 104, 105

(56) References Cited

U.S. PATENT DOCUMENTS

| | | | |
|---|---|---|---|
| 4,845,658 A | 7/1989 | Gifford | |
| 4,965,559 A | 10/1990 | Dye | |
| 5,241,625 A | 8/1993 | Epard et al. | |
| 5,321,750 A | 6/1994 | Nadan | |
| 5,408,606 A | * 4/1995 | Eckart ........................ 345/505 |
| 5,450,590 A | 9/1995 | Elko et al. | |
| 5,485,559 A | 1/1996 | Sakaibara et al. | |
| 5,485,570 A | 1/1996 | Busboom et al. | |
| 5,634,018 A | 5/1997 | Tanikoshi et al. | |
| 5,752,246 A | 5/1998 | Rogers et al. | |
| 5,757,385 A | 5/1998 | Narayanaswami et al. | |
| 5,794,016 A | 8/1998 | Kelleher | |
| 5,809,240 A | 9/1998 | Kumagai | |
| 5,841,444 A | 11/1998 | Mun et al. | |
| 5,940,086 A | 8/1999 | Rentschler et al. | |
| 5,968,120 A | 10/1999 | Guedalia | |
| 6,002,409 A | 12/1999 | Harkin | |
| 6,064,403 A | 5/2000 | Hayashi et al. | |
| 6,067,097 A | 5/2000 | Morita et al. | |
| 6,085,216 A | 7/2000 | Huberman et al. | |
| 6,104,392 A | 8/2000 | Shaw et al. | |
| 6,249,294 B1 | 6/2001 | Lefebvre et al. | |
| 6,269,275 B1 | 7/2001 | Slade | |
| 6,292,200 B1 | 9/2001 | Bowen et al. | |
| 6,611,241 B1 | * 8/2003 | Firester et al. ............... 345/1.3 |
| 2003/0048276 A1 | * 3/2003 | Wasserman et al. ......... 345/581 |

OTHER PUBLICATIONS

Computer Graphics, vol. 26, No. 2, Jul. 1992, "PixelFlow: High speed rendering using image composition" by Molnar et al, pp. 231–240.*

Greg Humphreys, et al., "WireGL: A Scalable Graphics System for Clusters," ACM SIGGRAPH (Los Angeles, CA), 12 pages, (Aug. 12–17, 2001).

Peter Hochschild, et al., "Scalable Graphics Engine, High–Performance Parallel Graphics," IBM T.J. Watson Research Center, 7 pages, (Oct. 30, 2000).

Peter Hochschild, "SGE Tunnel Programming Notes," 4 pages, (Nov., 2000).

Thomas Jackman, et al., "The Deep View Visualization System," 5 pages.

Shigeru Muraki, et al., "Next–Generation Visual Supercomputing Using PC Clusters with Volume Graphics Hardware Devices," Association for Computing Machinery, (Denver), 8 pages, (Nov., 2001).

* cited by examiner

*Primary Examiner*—Kee M. Tung

(57) ABSTRACT

A centralized resource system comprises a plurality of compute resource units, a plurality of visualization resource units, and a switching fabric coupling the plurality of visualization resource units to the plurality of compute resource units. The switching fabric is operable to couple select one or more visualization resource units to select one or more compute resource units for generating at least one graphical image. A plurality of display devices is coupled to the one or more select visualization resource units operable to display the at least one graphical image.

36 Claims, 3 Drawing Sheets

CENTRALIZED SCALABLE RESOURCE ARCHITECTURE AND SYSTEM

TECHNICAL FIELD OF THE INVENTION

The present invention relates generally to the field of computer systems, and more particularly to a centralized scalable resource architecture and system.

BACKGROUND OF THE INVENTION

In the days when mainframe computers and super computers dominated the digital landscape, users were typically given slices of computing time from a fixed pool so that the computer worked on many jobs in parallel. Users interfaced with the mainframe computers using "dumb terminals" connected to the mainframe computers and a simple command-line user interface. However, the computing environment gradually shifted to lower-cost personal computers and workstations, which offers users greater control of how their applications are executed and a better and more intuitive graphical user interface. More recently however, with the global connectivity provided by the Internet and faster bandwidths, there has been another shift toward simplified or stripped-down computers or appliances connected with the centralized data storage and computing resources provided by "web farms" via the Internet. Web farms are typically clusters of servers, microcomputers and mainframe computers that currently perform mostly web server and hosting function for web applications and web pages.

In the computer graphics domain, current computer graphical visualization systems may employ a cluster of workstations or personal computers executing a graphics application and working simultaneously on a single job to render an image to be displayed on a display device. The image is displayed as a single logical image on a single monitor screen or across multiple monitor screens. Such visualization systems may use a plurality of graphics pipelines to render different portions of an image for display on the display monitor to speed up processing time and improve the quality of the displayed image.

SUMMARY OF THE INVENTION

In accordance with an embodiment of the present invention, a centralized resource system comprises a plurality of compute resource units, a plurality of visualization resource units, and a switching fabric coupling the plurality of visualization resource units to the plurality of compute resource units. The switching fabric is operable to couple select one or more visualization resource units to select one or more compute resource units for generating one or more graphical images. A plurality of display devices are operable to display the one or more graphical images coupled to the one or more select visualization resource units.

In accordance with another embodiment of the invention, a centralized resource system comprises a plurality of first compute resource units, a plurality of second compute resource units, and a switching fabric coupling the plurality of second compute resource units to the plurality of first compute resource units. The switching fabric is operable to selectively couple outputs of the plurality of first compute resource units to inputs of the plurality of second compute resource units. The plurality of first and second compute resource units operable and function together to generate one or more execution results. A plurality of display devices is coupled to the plurality of first and second compute resource units and operable to receive execution results therefrom.

In accordance with yet another embodiment of the present invention, a centralized resource system comprises first resource means, second resource means, and means for selectively coupling one or more outputs of the first resource means to one or more inputs of the second resource means. A plurality of display means is coupled to the first and second resource means and operable to receive and display execution results therefrom.

In accordance with another embodiment of the present invention, a method comprises the steps of receiving a graphics visualization job to be executed by a plurality of compute resources, determining compute resource requirements for the job, determining compute resource availability, and allocating compute resources in response to the determined compute resource requirements and availability. The method further comprises determining destinations to receive results of the job, and allocating and configuring communication channels from the allocated compute resources to the destinations.

In accordance with a further embodiment of the present invention, a graphics visualization architecture comprises a plurality of compute resource units, a plurality of graphics pipelines, and a first switching fabric coupling the plurality of graphics pipelines to the plurality of compute resource units. The first switching fabric is operable to selectively couple outputs of the plurality of compute resource units to inputs of the plurality of graphics pipelines. The architecture further comprises a plurality of compositors, and a second switching fabric coupling the plurality of compositors to the plurality of graphics pipelines, where the second switching fabric is operable to selectively couple outputs of the plurality of graphics pipelines to inputs of the plurality of compositors.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 5 of the drawings, like numerals being used for like and corresponding parts of the various drawings.

Current computer graphical visualization systems such as Hewlett-Packard Company's Visualization Center sv6 (HP sv6) typically employ a cluster of workstations and visualization resources processing and rendering a single graphical image to be displayed as a single image. HP sv6 is described in U.S. patent application Ser. No. 09/715,335, entitled "SYSTEM AND METHOD FOR EFFICIENTLY RENDERING GRAPHICAL DATA," filed on Nov. 17, 2000.

Figure 1:
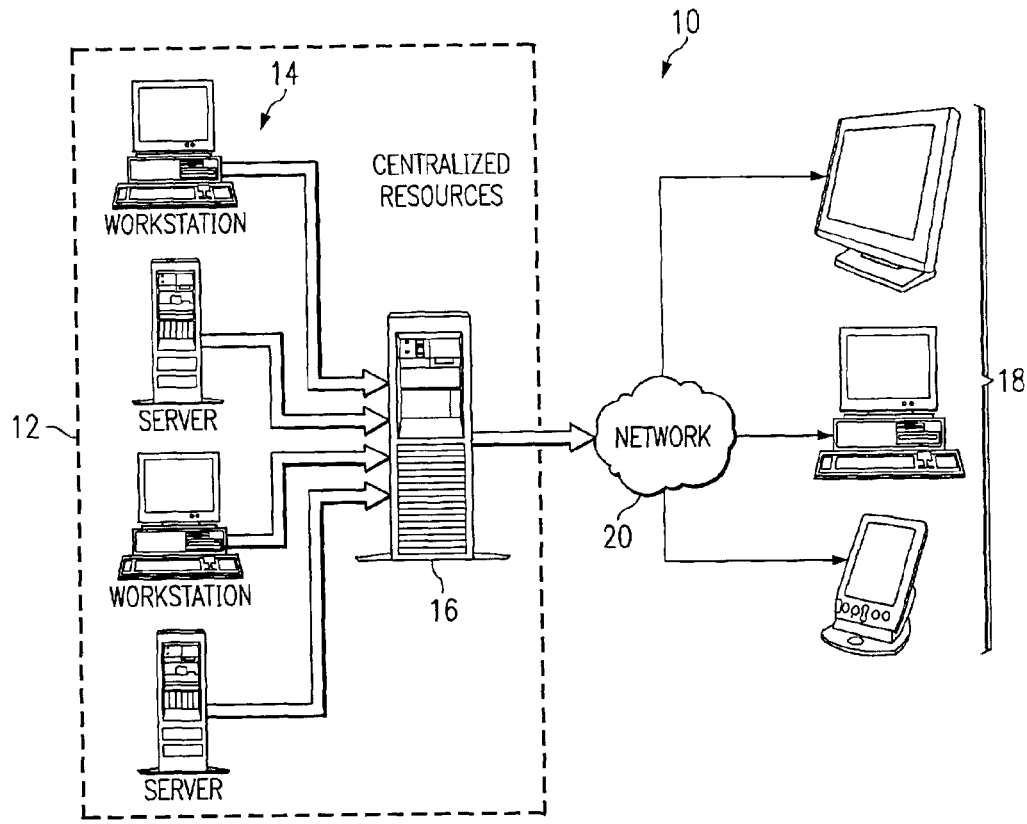
FIG. 1 is a simplified diagram of an embodiment of a centralized scalable resource architecture and system according to the teachings of the present invention.

FIG. 1 is a simplified diagram of an embodiment of a system 10 constructed according to the centralized scalable resource architecture of the present invention. System 10 employs a centralized resource 12, which may comprise data storage building blocks, computing resource building blocks, and other scalable resources. For example, centralized resource 12 comprises personal computers, workstations, servers and other computers 14 that can be easily added to the configuration of computing resources or removed therefrom according to need. A software such as a graphics application is executed in computers 14 acting as host computers. Centralized resource 12 may also comprise more specialized computing resources such as graphics or visualization resources 16 coupled to computers 14. Visualization resource 16 may comprise graphics pipelines, frame buffers, compositors and other specialized hardware and software resources used for graphics rendering. Visualization resource 16 may be implemented in hardware ranging from specialized graphics cards to powerful workstations. Centralized resources 12 are coupled to user terminals or display devices 18 via a network 20. Network 20 may be a local area network (LAN), wide area network (WAN), Internet, or any other suitable network or connectivity. User terminals or display devices 18 are devices on which users may view results data processed and generated by centralized resources 12. Display devices 18 may employ any display technology now known or later developed. According to the teachings of the present invention, all the processing and visualization functions are performed by centralized resources 12 so that only data associated with the processed result are conveyed to the user. For example in the graphics application, only pixel data associated with the rendered 2-dimensional (2D) or 3-dimensional (3D) images to be displayed on display devices 18 are transmitted over network 20. The pixel or image data to be displayed to the user is usually several magnitudes less than the data needed to generate the graphics images, so that the data transmission time is significantly shortened and the data storage requirement at the users' computer terminals is minimal.

Figure 2:
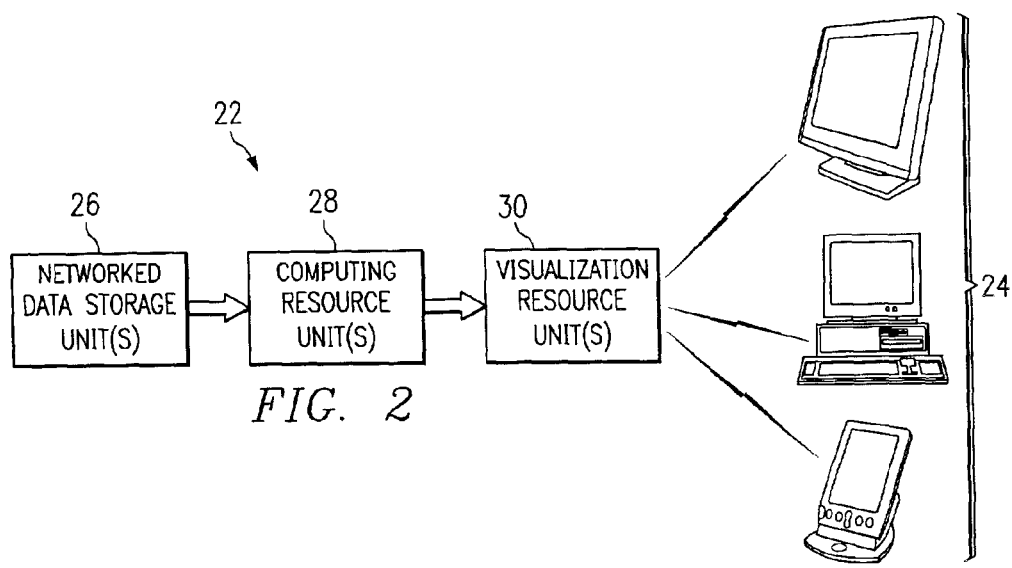
FIG. 2 is a simplified block diagram of an embodiment of a centralized scalable resource architecture and system for graphics visualization according to the teachings of the present invention.

Unlike conventional systems, centralized scalable system 10 is operable to allocate centralized resources 12 to multiple jobs simultaneously to generate multiple images to be displayed on the respective display devices. The allocation unit of the computing resources, for example, may be a CPU (central processing unit) and the allocation unit of the visualization resources, for example, may be a graphics pipeline and its associated hardware/software. Referring to FIG. 2, a subset of resources 22 is allocated to each job or an execution of an application software for displaying results on a subset of display devices 24, so that centralized scalable resource system 10 is operable to perform multiple jobs and execute multiple applications. Subset of resources 22 may comprise one or more networked data storage units 26, one or more computing resource units 28, and one or more visualization resource units 30. Centralized and scalable resource architecture and system 10 comprises a configurable connectivity between centralized resources 12 and display devices 18 to enable re-allocation on-the-fly.

Figure 3:
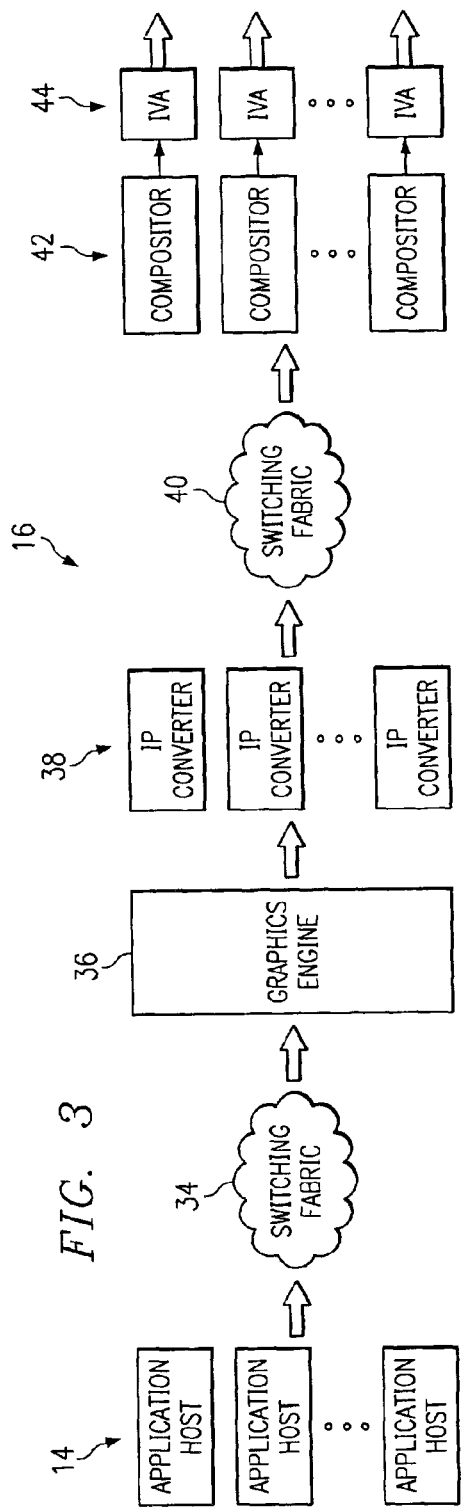
FIG. 3 is a more detailed block diagram of an embodiment of a centralized scalable resource architecture and system for graphics visualization according to the teachings of the present invention.
Figure 4:
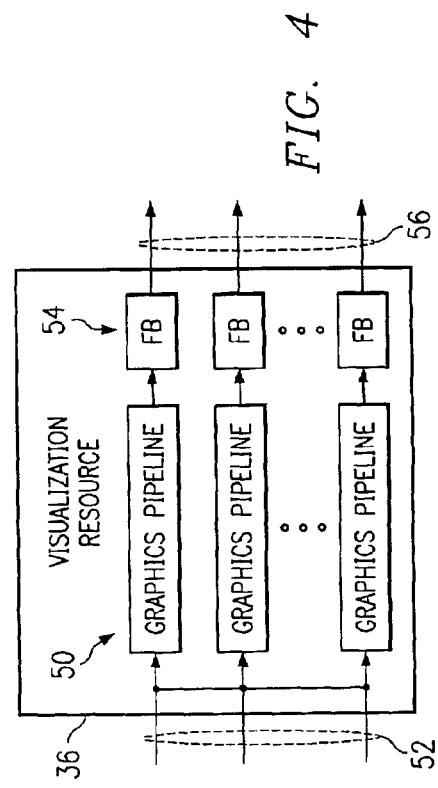
FIG. 4 is a simplified block diagram of a graphics engine.

FIG. 3 is a more detailed block diagram of an embodiment of a centralized scalable resource architecture and system 10 for graphics visualization according to the teachings of the present invention. Centralized scalable resource architecture and system 10 comprises computing resources 14 such as a plurality of application hosts coupled to a switching fabric 34, which provides configurable connectivity to a graphics engine 36 of visualization resources 16. Not explicitly shown in this figure is a cluster of data storage devices that may be coupled to application hosts 14 for storing the data needed for generating the graphical images. Referring to FIG. 4, graphics engine 36 comprises a plurality of workstations with graphics pipelines 50 receiving graphical data 52 from application hosts 14, where switching fabric 34 determines which graphics pipelines receive graphical data from which application hosts. Graphics pipelines 50 may be arranged to have a master pipeline and slave pipelines interconnected by a local area network (LAN), for example. Depending on the resource requirements of an application and the size of the job, the number of application hosts and the number of graphics pipelines working on the job can be configured by changing the connectivity of the application hosts to the graphics pipelines. Switching fabric 34 may comprise switches, routers, switched networks and/or other network components. In particular, switching fabric 34 comprises a M×N switch that can couple any of its inputs to any of its outputs, such as a crossbar switch, a cross-connect, an Ethernet switch, or any device which is operable to connect any of its outputs to its inputs on-the-fly. The number of switch inputs, M, may equal the number of switch outputs, N. A frame buffer (FB) 54 is coupled to each graphics pipeline 50 and operable to store one or more frames of image or pixel data rendered by the graphics pipeline. The output of frame buffers 54 is preferably DVI (digital video interface) data 56 but may be other types of graphics data. DVI data typically comprise the coordinate values of the pixel position to be displayed on the display screen, and the color values of the pixel. For example, DVI data may comprise the (X,Y) coordinate value of the pixel, RGB (red, green, blue) values. DVI data may further comprise a depth value for the pixel (Z), and a transparency value for the pixel ($\alpha$).

Referring also to FIG. 3, each output from a frame buffer 54 is coupled to a converter 38. A second switching fabric 40 is coupled to the output of converters 38 to route the IP packets to the proper subset of compositors 42, IVA (Internet visualization architecture) components 44, and the display devices beyond for display to the users.

It should be noted that FIG. 3 is a functional block diagram and that functionality of more than one block shown therein may be integrated together. For example, the functionality of IP Converter 38 can be integrated with graphics engine 36, or that the functionality of compositors 42 may be incorporated into IVA 44 or switching fabric 40.

In operation, application hosts 14 execute one or multiple graphics applications or one or more instances of a graphics application to render one or multiple graphical images. The graphical images may be displayed on one or more display devices. Switching fabric 34 is operable to connect, on-the-fly, the output of selected application hosts to selected graphics pipelines in graphics engine 36. Therefore, the cluster of servers, workstations and computers is essentially configurable into one or more sub-clusters to process one or more jobs. The output of the application host(s) executing a particular job can be coupled and routed to one or more graphics pipelines for rendering the image by switching fabric 34. IP converters 38, receiving the output from graphics engine 36, are operable to convert or packetize DVI data into data packets to facilitate transmission over a network. Depending on the type of network used to transmit the data to the display devices, converter 38 inserts header and protocol information according to the network type. For example, Transmission Control Protocol (TCP) and Internet Protocol (IP) may be used as the transmission protocol so that converters 38 are operable to convert the pixel data from the pipelines in graphics engine 36 to IP packets. Second switching fabric 40 is operable to connect and route, on-the-fly, the output of selected converters to the input of selected compositors 42. Each compositor 42 is operable to combine or composite one or more image data streams from converters 38 into one or more image data streams that are then sent to the display devices for display. Because the data are in the form of data packets or IP packets, for example, compositors 42 are operable to process the data after stripping off the header and other information. Thereafter, IVA 44 is operable to compress the composited image data, packetize it, and send it to one or more remote receivers or client devices for display via a network such as the Internet and other suitable networks. Therefore, IVA is operable to add destination information, protocol headers and other data to the image data to form data packets. IVA is also responsible for transmitting user input data such as keyboard and mouse input entered by the user to application host 14. Such user input may be used to control the processing of application hosts 14 and/or graphics engine 36. The users entering such input may be co-located with one or more of the display devices or be located remotely from the display devices.

Figure 5:
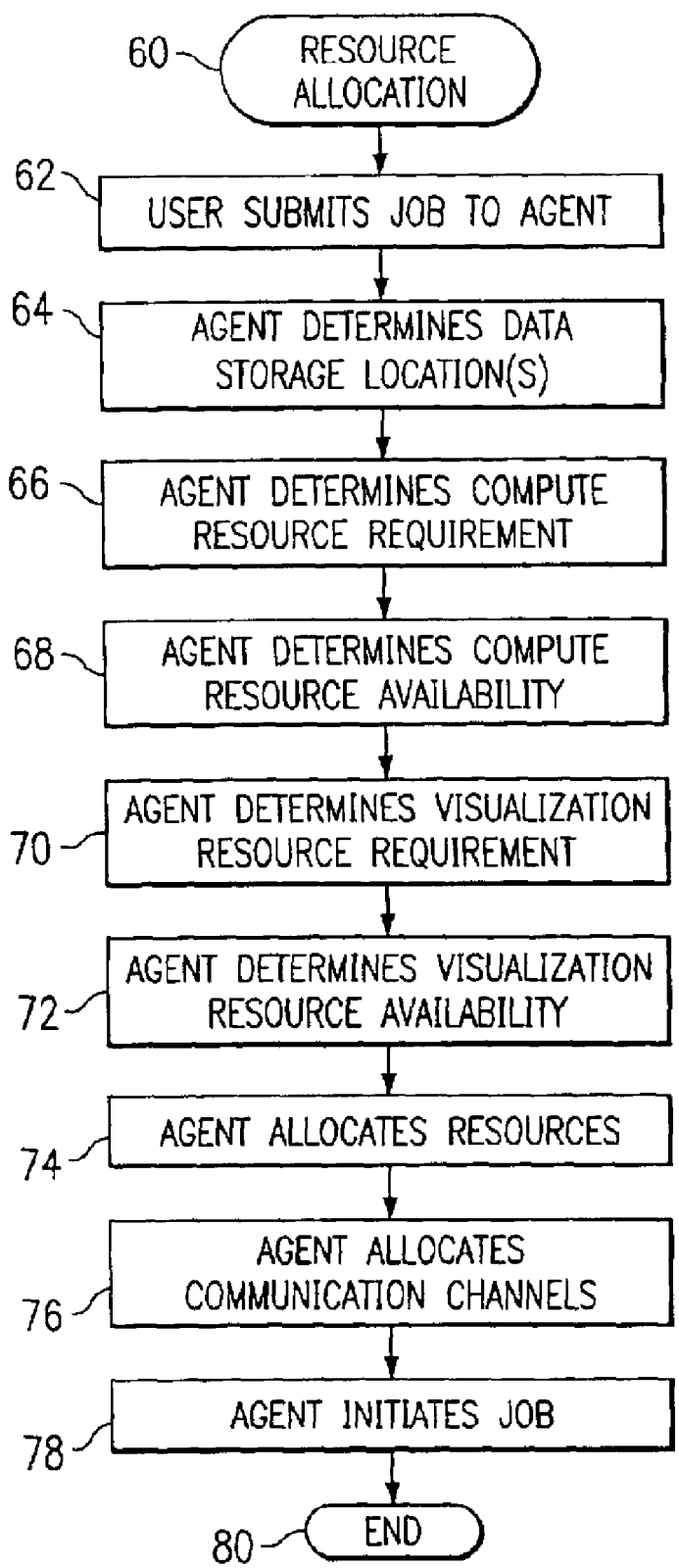
FIG. 5 is a flowchart of a process for determining resource allocation according to an embodiment of the present invention.

In this manner, any number of compute resource units may operate together to process a single job, resulting in the possibility of together executing multiple jobs by centralized scalable resource system 10 to be sent to multiple destinations. The allocation of the compute resource units and the visualization resource units is determined based on a number of considerations. FIG. 5 is a flowchart of a controlling process 60 for determining and making resource allocation according to an embodiment of the present invention. Resource allocation method 60 may employ agent technology. An agent may be software and/or hardware that accepts jobs submitted by the users, as shown in block 62. The agent determines where the data needed for executing the job is stored, as shown in block 64, which may be multiple storage devices and/or multiple storage locations. The agent then determines the compute resource requirements for the job and the availability of the needed compute resources, as shown in blocks 66 and 68. For graphical applications, the agent also determines the visualization resource requirements and the availability thereof, as shown in blocks 70 and 72. The agent then allocates the resources, as shown in block 74. The amount of resources allocated may be less than the optimum required for the submitted job due to resource unavailability. Next in block 76 the agent determines and allocates the communication channels needed to connect the data storage to the allocated compute resources and to the visualization resources. The agent also determines and allocates the communication channels to the users or the display devices. The agent configures the switching fabrics to selectively connect the appropriate allocated compute and visualization resources and compositors. The agent then initiates the job execution or sends a message to the application hosts to initiate job execution. The process ends in block 80.

Centralized scalable resource system and architecture 10 may be used for generalized computing applications or specialized applications such as graphics and visualization. The resources can be remotely located from the users because only the results of the execution are transmitted over the network to reduce bandwidth requirements and transmit time. As an example, several engineering and design teams work together on the design of a new vehicle. The design and simulation data are stored at a central storage site. At a design review, reviewers are located at a number of locations remotely from the central storage site. The reviewers may review several different system designs of the vehicle. For example, one review team may review the exterior design of the vehicle, another may review a wind tunnel simulation on the vehicle exterior, yet another team may review the engine design. Centralized scalable resource system 10 is operable to access the different sets of design data stored at the central storage site, render graphical images of the design and then send the rendered graphical images to the respective review teams. The rendered images are displayed for viewing by the respective teams. The switching fabrics are operable to connect and route the output from the subset of compute resource units to the subset of visualization resource units that have been allocated to the job. Therefore, system 10 is scalable and reallocatable according to the requirements of the executed jobs.

What is claimed is:

1. A centralized resource system, comprising:
 a plurality of compute resource units;
 a plurality of visualization resource units;
 a switching fabric operable to dynamically couple select one or more of the plurality of visualization resource units to select one or more of the plurality of compute resource units for generating at least one graphical image from a plurality of graphical images; and
 a plurality of display devices coupled to the one or more select visualization resource units operable to display the at least one graphical image, wherein the plurality of visualization resource units comprise:
 a plurality of graphics pipelines;
 a plurality of compositors; and
 a second switching fabric coupling the compositors to the plurality of graphics pipelines.

2. The system, as set forth in claim 1, wherein the plurality of display devices is coupled to the one or more select visualization resource units via a network.

3. The system, as set forth in claim 1, wherein the switching fabric comprises a crossbar switch.

4. A centralized resource system, comprising:
 a plurality of compute resource units;
 a plurality of visualization resource units;
 a switching fabric operable to dynamically couple select one or more of the plurality of visualization resource units to select one or more of the plurality of compute resource units for generating at least one graphical image from a plurality of graphical images; and
 a plurality of display devices coupled to the one or more select visualization resource units operable to display the at least one graphical image, wherein the plurality of visualization resource units comprise:
 a plurality of graphics pipelines;
 a plurality of converters each coupled to a respective graphics pipeline, each converter operable to packetize data from a graphics pipeline;
 a plurality of compositors; and
 a second switching fabric coupling the plurality of compositors to the plurality of converters.

5. The system, as set forth in claim 4, wherein the second switching fabric comprises a crossbar switch.

6. A centralized resource system, comprising:
 a plurality of compute resource units;
 a plurality of visualization resource units;
 a switching fabric operable to dynamically couple select one or more of the plurality of visualization resource units to select one or more of the plurality of compute resource units for generating at least one graphical image from a plurality of graphical images; and a plurality of display devices coupled to the one or more select visualization resource units operable to display the at least one graphical image; and an agent operable to determine a requirement for computing resource units, determine a requirement for visualization resource units, and allocate the computing resource units and visualization resource units.

7. The system, as set forth in claim 6, wherein the plurality of visualization resource units comprise:

a graphics engine; and a plurality of compositors coupled to the graphics engine.

8. A centralized resource system, comprising:

a plurality of first compute resource units;

a plurality of second compute resource units;

a switching fabric coupling the plurality of second compute resource units to the plurality of first compute resource units, the switching fabric operable to dynamically selectively couple outputs of the plurality of first compute resource units to inputs of the plurality of second compute resource units, the first and second plurality of compute resource units operable to function together to generate at least one execution result; and a plurality of display devices coupled to the plurality of first and second compute resource units and operable to receive the execution results therefrom, wherein the plurality of second resource units comprise:

a plurality of graphics pipelines;

a plurality of compositors; and a second switching fabric coupling the plurality of compositors to the plurality of graphics pipelines, the second switching fabric operable to selectively couple outputs of the plurality of graphics pipelines to inputs of the plurality of compositors.

9. The system, as set forth in claim 8, wherein the plurality of display devices is coupled to the plurality of first and second resource units via a network.

10. The system, as set forth in claim 8, wherein the switching fabric comprises a crossbar switch.

11. The system, as set forth in claim 8, wherein the plurality of display devices are located remotely from the plurality of first and second resource units.

12. The system, as set forth in claim 8, wherein the plurality of display devices is coupled to the plurality of first and second resource units via a computer network.

13. The system, as set forth in claim 8, wherein the plurality of display devices is coupled to the plurality of first and second resource units via an Intranet.

14. The system, as set forth in claim 8, wherein the plurality of first resource units comprise central processing units.

15. The system, as set forth in claim 8, wherein the plurality of second resource units comprise central processing units.

16. A centralized resource system, comprising:

a plurality of first compute resource units;

a plurality of second compute resource units;

a switching fabric coupling the plurality of second compute resource units to the plurality of first compute resource units, the switching fabric operable to dynamically selectively couple outputs of the plurality of first compute resource units to inputs of the plurality of second compute resource units, the first and second plurality of compute resource units operable to function together to generate at least one execution result; and a plurality of display devices coupled to the plurality of first and second compute resource units and operable to receive the execution results therefrom, wherein the plurality of second resource units comprise:

a plurality of graphics pipelines;

a plurality of converters each coupled to a respective graphics pipeline, each converter operable to packetize data from a graphics pipeline;

a plurality of compositors; and a second switching fabric coupling the plurality of compositors to the plurality of converters, the second switching fabric operable to selectively couple outputs of the plurality of converters to inputs of the plurality of compositors.

17. The system, as set forth in claim 16, wherein the second switching fabric comprises a crossbar switch.

18. A centralized resource system, comprising:

a plurality of first compute resource units;

a plurality of second compute resource units;

a switching fabric coupling the plurality of second compute resource units to the plurality of first compute resource units, the switching fabric operable to dynamically selectively couple outputs of the plurality of first compute resource units to inputs of the plurality of second compute resource units, the first and second plurality of compute resource units operable to function together to generate at least one execution result; and a plurality of display devices coupled to the plurality of first and second compute resource units and operable to receive the execution results therefrom; and an agent operable to determine a requirement for the first resource units, determine a requirement for the second resource units, and allocate the first and second resource units in response thereto.

19. The system, as set forth in claim 18, wherein the plurality of second resource units comprise:

a graphics engine; and a plurality of compositors coupled to the graphics engine.

20. A centralized resource system, comprising:

first resource means;

second resource means;

means for dynamically selectively coupling one or more outputs of the first resource means to one or more inputs of the second resource means; and a plurality of display means coupled to the first and second resource means and operable to receive and display execution results therefrom; and agent means for determining a requirement for the first resource means, determining a requirement for the second resource means, and allocating the first and second resource means in response thereto.

21. The centralized resource system, as set forth in claim 20, further comprising second means for selectively coupling one or more outputs of the second resource means to inputs of the plurality of display means.

22. The centralized resource system, as set forth in claim 21, wherein the second selectively coupling means comprise means for switching.

23. The centralized resource system, as set forth in claim 20, wherein the selectively coupling means comprises means for switching.

24. The centralized resource system, as set forth in claim 20, wherein the second resource means comprise:
- means for generating graphics data; and
- means for compositing the graphics data coupled to the means for generating graphics data.

25. The centralized resource system, as set forth in claim 20, further comprising data storage means coupled to the first resource means for storing data.

26. A method of controlling and allocating compute resources, comprising:
- receiving a graphics visualization job to be executed by a plurality of compute resources;
- determining compute resource requirements for the job;
- determining compute resource availability;
- allocating compute resources from the plurality of compute resources in response to the determined compute resource requirements and availability;
- determining destinations to receive results of the job; and
- allocating and configuring communication channels from the allocated compute resources to the determined destinations.

27. The method, as set forth in claim 26, further comprising:
- determining visualization resource requirements for the job;
- determining visualization resource availability; and
- allocating visualization resources in response to the compute resource requirements and availability.

28. The method, as set forth in claim 27, further comprising:
- determining second communication channels from the allocated computing resources to the allocated visualization resources; and
- allocating the second communication channels.

29. The method, as set forth in claim 28, wherein allocating the second communication channels comprises configuring a second switch coupled between the allocated compute resources to the allocated visualization resources.

30. The method, as set forth in claim 27, further comprising initiating the job.

31. The method, as set forth in claim 27, wherein allocating communication channels comprises configuring a switch coupled between the allocated compute resources to the determined destinations.

32. A graphics visualization architecture, comprising:
- a plurality of compute resource units;
- a plurality of graphics pipelines;
- a first switching fabric coupling the plurality of graphics pipelines to the plurality of compute resource units, the first switching fabric operable to selectively couple outputs of the plurality of compute resource units to inputs of the plurality of graphics pipelines;
- a plurality of compositors; and
- a second switching fabric coupling the plurality of compositors to the plurality of graphics pipelines, the second switching fabric operable to selectively couple outputs of the plurality of graphics pipelines to inputs of the plurality of compositors.

33. The architecture, as set forth in claim 32, further comprising a plurality of display devices coupled to the plurality of compositors and operable to receive and display rendered graphical images received from the plurality of compositors.

34. The architecture, as set forth in claim 32, wherein the plurality of display devices is coupled to the plurality of compositors via the Internet.

35. The architecture, as set forth in claim 32, further comprising an agent operable to determine a requirement for the compute resource units, determine a requirement for the graphics pipelines, and allocate the compute resource units and graphics pipelines in response thereto.

36. The architecture, as set forth in claim 32, wherein the first and second switching fabrics each comprises a crossbar switch.

* * * * *